(12) United States Patent
Kawana (10) Patent No.: US 9,195,037 B2
(45) Date of Patent: Nov. 24, 2015

(54) PROJECTION DISPLAY APPARATUS

(71) Applicant: FUJIFILM Corporation, Tokyo (JP)

(72) Inventor: Masanao Kawana, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 274 days.

(21) Appl. No.: 14/032,865

(22) Filed: Sep. 20, 2013

(65) Prior Publication Data

US 2014/0022520 A1   Jan. 23, 2014

Related U.S. Application Data

(63) Continuation of application No. PCT/JP2012/001871, filed on Mar. 16, 2012.

(30) Foreign Application Priority Data

Mar. 28, 2011 (JP) .................... 2011-069394

(51) Int. Cl.
| | |
|---|---|
| *G02B 17/06* | (2006.01) |
| *G02B 17/08* | (2006.01) |
| *G02B 13/16* | (2006.01) |

(Continued)

(52) U.S. Cl.
CPC ............. *G02B 17/06* (2013.01); *G02B 13/16* (2013.01); *G02B 17/08* (2013.01); *G02B 17/0852* (2013.01); *G03B 21/28* (2013.01); *G03B 33/12* (2013.01)

(58) Field of Classification Search
CPC ........ G02B 13/16; G02B 17/06; G02B 17/08; G02B 17/0852; G03B 21/28; G03B 33/01
See application file for complete search history.

(56) References Cited

U.S. PATENT DOCUMENTS

| 7,448,760 B2 | 11/2008 | Yamagishi |
| 8,054,541 B2 | 11/2011 | Kang et al. |
| 2007/0253076 A1 | 11/2007 | Takaura et al. |

(Continued)

FOREIGN PATENT DOCUMENTS

| JP | 2006-195433 | 7/2006 |
| JP | 2007-323047 | 12/2007 |
| JP | 2010-217887 | 9/2010 |

OTHER PUBLICATIONS

NPL English-Language Translation of International Preliminary Report on Patentability prepared for PCT_JP2014_001871 on Oct. 1, 2013.*

(Continued)

*Primary Examiner* — David N Spector
(74) *Attorney, Agent, or Firm* — Young & Thompson (57) ABSTRACT

A projection display apparatus includes an image display element for displaying an image on a reduction side conjugate plane and a projection optical system for magnifying and projecting the image onto a screen which is a magnification side conjugate plane as a conjugate image. The projection optical system substantially consists of a dioptric system and a catoptrics system having a common axis. The center of a display surface of the image display element is disposed eccentrically with respect to the optical axis and, when a magnification side conjugate position of the center of the display surface is vertically above the optical axis, an intersection point between a lower light ray of a light flux focused on the bottom center of the conjugate image and an upper light ray of a light flux focused on the top center of the conjugate image falls within a predetermined range.

8 Claims, 9 Drawing Sheets (51) Int. Cl.
*G03B 21/28* (2006.01)
*G03B 33/12* (2006.01)

(56) References Cited

U.S. PATENT DOCUMENTS

2009/0141370 A1 6/2009 Takaura et al.
2009/0323202 A1 12/2009 Chen et al.
2010/0315725 A1 12/2010 Lin
2011/0002051 A1 1/2011 Hsu et al.
2011/0292515 A1 12/2011 Kang et al.

OTHER PUBLICATIONS

International Search Report, PCT/JP2012/001871, Jul. 17, 2012.

* cited by examiner

FIG.1

FIG.2
EXAMPLE 1

FIG.4

EXAMPLE 1

FIG.6

EXAMPLE 2 size:5000[micron]   size:5000[micron]   size:5000[micron]

FIG.7

EXAMPLE 2

PROJECTION DISPLAY APPARATUS

CROSS REFERENCE TO RELATED APPLICATIONS

This application is a continuation of PCT/JP2012/001871 filed on Mar. 16, 2012, which claims foreign priority to Japanese Application No. 2011-069394 filed on Mar. 28, 2011. The entire contents of each of the above applications are hereby incorporated by reference.

BACKGROUND OF THE INVENTION

1. Field of the Invention

The present invention relates to a projection display apparatus and more particularly to a projection display apparatus provided with a projection optical system for focusing an image displayed on an image display element on a screen using a dioptric system and a catoptric system.

2. Description of the Related Art

Heretofore, projection image display apparatuses in which an image displayed by an image display element is magnified and projected onto a screen by a projection optical system have been used. As for the projection optical system that can be used in such a projection display apparatus, a projection optical system that combines a dioptric system composed of a plurality of lenses and a catoptric system that includes a mirror is known as described, for example, in Japanese Unexamined Patent Publication No. 2007-323047.

SUMMARY OF THE INVENTION

In the mean time, a development race is under way in the field of projection display apparatus, and downsizing with a reduced cost for the apparatus are demanded. Further, it has also been demanded in recent years that a sufficiently large magnified image is obtained on a screen with a reduced projection distance. In order to achieve this, it is necessary to reduce the distance between the housing of an apparatus in which the projection optical system is mounted and the screen. It is also demanded that the apparatus has good projection performance appropriate for the resolution of the light valve under the performance improvement of light valves in recent years.

The present invention has been developed in view of the circumstances described above, and it is an object of the present invention to provide an inexpensive and compact projection display apparatus having favorable projection performance and allowing, in particular, the distance between the housing of the apparatus and the screen to be reduced.

A projection display apparatus of the present invention is a projection display apparatus provided with an image display element for displaying an image on a reduction side conjugate plane and a projection optical system for projecting the image onto a magnification side conjugate plane as a conjugate image, wherein:

the projection optical system substantially consists of a dioptric system substantially composed of a plurality of lenses and a catoptric system having a negative power arranged in this order from the reduction side;

the dioptric system and the catoptric system have a common optical axis;

the center of a display surface of the image display element for displaying the image is disposed eccentrically with respect to the optical axis, and the projection optical system is configured such that, when a magnification side conjugate position of the center of the display surface is vertically above the optical axis, an intersection point between a lower light ray of a light flux focused on the bottom center of the conjugate image and an upper light ray of a light flux focused on the top center of the conjugate image is on the reduction side of a surface vertex of a lens surface closest to the catoptric system in the dioptric system; and the projection optical system satisfies a conditional expression (1) given below:

$$0.35 < Dc/Dd < 0.55 \qquad (1),$$

where:

Dc is a distance on the optical axis between the dioptric system and the catoptric system; and Dd is a distance on the optical axis from the most reduction side lens surface to the most magnification side lens surface in the dioptric system.

In the projection display apparatus of the present invention, it is preferable that the dioptric system includes therein an aperture stop and has two or more aspherical lenses on the magnification side of the aperture stop.

Further, in the projection display apparatus of the present invention, it is preferable that the dioptric system has one or more aspherical lenses on the reduction side of the aperture stop.

Still further, in the projection display apparatus of the present invention, it is preferable that all optical surfaces constituting the dioptric system and the catoptric system are composed of rotationally symmetric surfaces.

The term "magnification side" as used herein refers to the projected side (screen side). Even when reduced size projection is performed, the term "magnification side" and "reduction side" described above are used herein to respectively refer to the screen side and the side of image display element, such as a light valve or the like, for convenience.

The term "closest to - - - " in the phrase "the lens surface closest to the catoptric system in the dioptric system" is judged by the arrangement order on the optical axis.

The term "rotationally symmetric surfaces" as used herein refers to surfaces composed of rotational surfaces (including partially missing rotational surfaces).

According to the projection display apparatus of the present invention, favorable projection performance may be realized while allowing the distance between the housing of the apparatus and the screen to be reduced because the apparatus uses a dioptric system substantially composed of a plurality of lenses and a catoptric system having a negative power, and a folded optical path is formed. Further, according to the projection display apparatus of the present invention, the positional relationship between an intersection point of two light rays focused on the conjugate image and a surface vertex of a lens surface closest to the catoptric system in the dioptric system is set appropriately, so that while the apparatus is configured such that the light fluxes used for image formation and optical members do not interfere with each other, the entire system may be downsized and the distance between the housing and the screen may be reduced. Still further, according to the projection display apparatus of the present invention, the dioptric system and catoptric system are configured as coaxial systems and to satisfy the conditional expression (1), so that downsizing and cost reduction may be realized.

DESCRIPTION OF THE PREFERRED EMBODIMENTS

Figure 1:
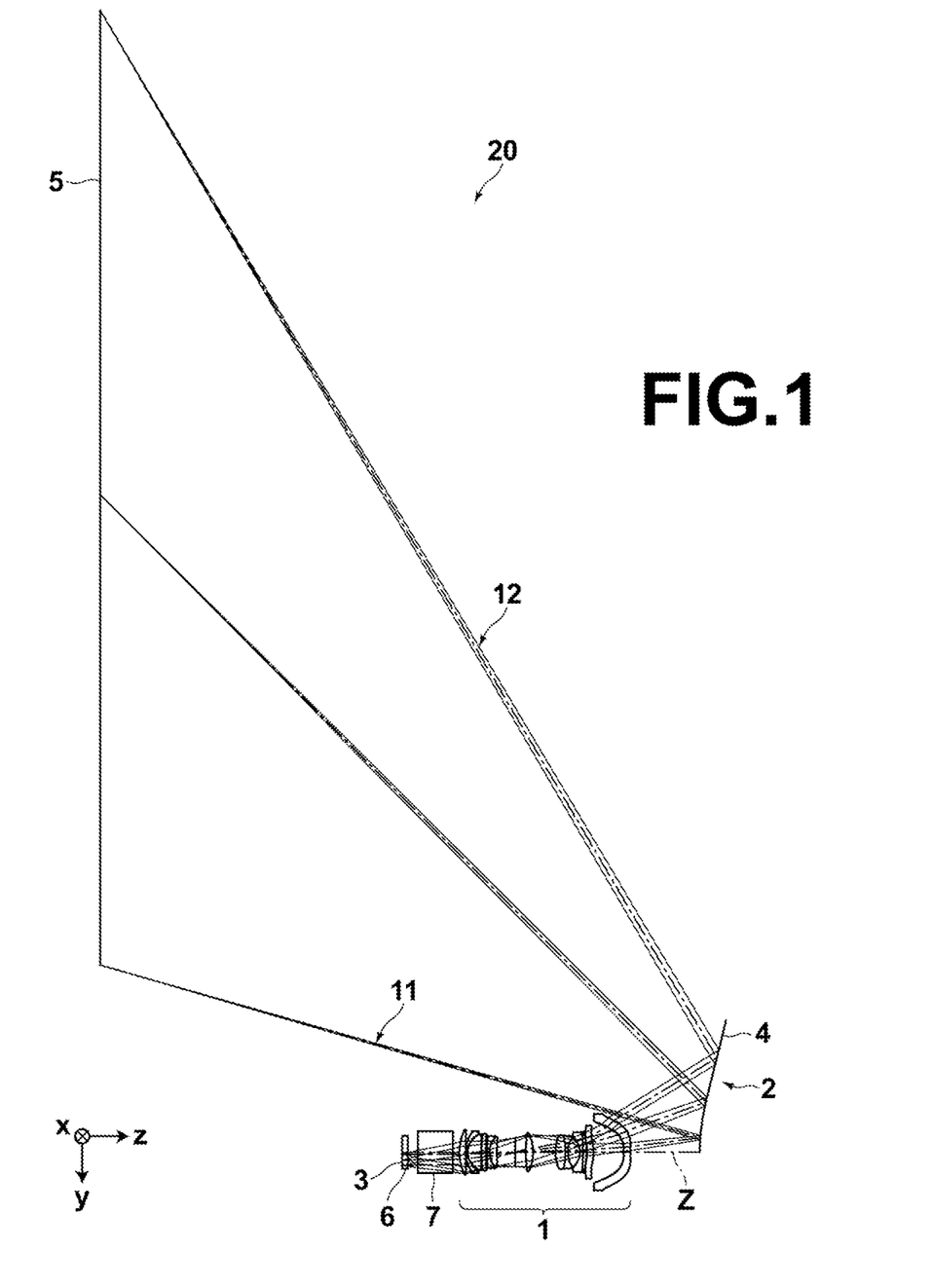
FIG. 1 is a cross-sectional view of a projection display apparatus according to an embodiment of the present invention, illustrating the configuration of a major portion thereof.
Figure 2:
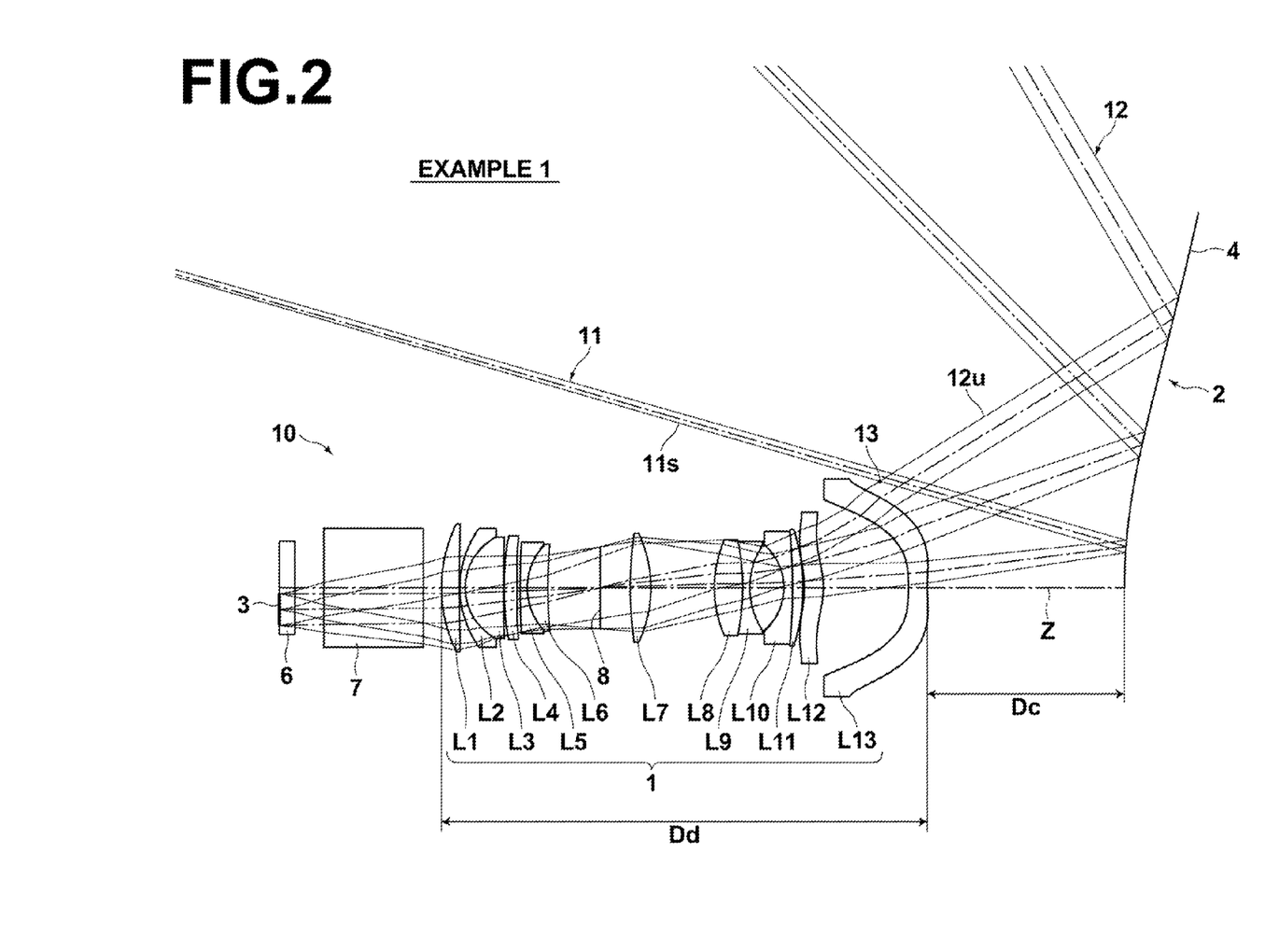
FIG. 2 is a cross-sectional view of a projection optical system according to Example 1 of the present invention, illustrating the configuration thereof.

Hereinafter, embodiments of the present invention will be described in detail with reference to the accompanying drawings. FIG. 1 is a cross-sectional view of a projection display apparatus 20 according to an embodiment of the present invention, illustrating the configuration of a major portion thereof. FIG. 2 is a cross-sectional view of a projection optical system 10 used in the projection display apparatus 20, illustrating the configuration thereof. Note that the configuration example shown in FIGS. 1 and 2 corresponds to the projection optical system of Example 1, to be described later. Here, the description will be made with reference to the example shown in FIGS. 1 and 2.

The projection display apparatus 20 includes an image display element 3 for displaying an image on a reduction side conjugate plane and a projection optical system 10 for projecting the image onto a screen 5 which is a magnification side conjugate plane as a conjugate image. The projection optical system 10 is configured to include a dioptric system 1 substantially composed of a plurality of lenses and a catoptric system 2 having a negative power.

For example, the dioptric system 1 may be composed of lenses L1 to L6, an aperture stop (virtual aperture stop) 8, and lenses L7 to L13 arranged in this order from the reduction side, as in the example of FIG. 2. For example, the catoptric system 2 may be composed of one reflection mirror 4 having a convex aspherical surface, as in the example of FIG. 2.

A projection optical system composed only of a dioptric system requires a long distance between the housing having therein the projection optical system and the screen, while a projection optical system that combines a dioptric system and a catoptric system, as in the present embodiment, may reduced the distance between the housing and the screen because the optical path is a folded optical path.

Further, for a projection optical system composed only of a dioptric system, if an attempt is made to reduce the focal length, i.e., to broaden the angle of view, the lens size on the magnification side inevitably becomes excessively large. In contrast, a projection optical system that combines a dioptric system and a catoptric system has an advantage of being suitable for broadening the angle of view as the lens size on the magnification side can be reduced and hence the focal length can be reduced.

The dioptric system 1 and catoptric system 2 have a common optical axis Z. The coaxial arrangement of the dioptric system 1 and catoptric system 2 will result in ease of assembly work for the projection optical system 10 with enhanced assembly accuracy, thereby contributing to realization of high performance and cost reduction.

As illustrated in FIG. 1, in a rectangular coordinate system of x, y, z axes, a vertical direction along the plane of FIG. 1 is taken as a y direction and a horizontal direction along the plane of FIG. 1 which is the same direction as that of the optical axis Z is taken as a z direction. Further, note that the image display element 3 and the display surface of the image display element 3 for displaying an image are integrally illustrated in FIGS. 1 and 2.

A cover glass 6 and a glass block 7 of assumed color combining prism, light deflection prism, and the like, are disposed on the reduction side of the dioptric system 1. In the example shown in FIGS. 1 and 2, the magnification side surface of the cover glass 6 appears to be disposed on the same plane as the display surface of the image display element 3, but not necessarily limited to this arrangement.

The center of the display surface of the image display element 3 is disposed eccentrically with respect to the optical axis Z so as to be vertically below the optical axis. In addition, a magnification side conjugate position of the center of the display surface of the image display element 3 is vertically above the optical axis Z. In such a positional relationship, in the projection display apparatus 20, a configuration is made such that an intersection point 13 between a lower light ray 11s of a light flux 11 focused on the bottom center of a conjugate image magnified and projected onto the screen 5 and an upper light ray 12u of a light flux 12 focused on the top center of the conjugate image is located on the reduction side of a surface vertex of a lens surface closest to the catoptric system 2 in the dioptric system 1. The term "the lens surface closest to the catoptric system 2 in the dioptric system 1" as used herein refers to the magnification side lens surface of a lens on the most magnification side of the lenses in the dioptric system 1 in the arrangement order on the optical axis Z, and it is the magnification side lens surface of the lens L13 in the example of FIG. 2. The term "a lower light ray 11s of a light flux 11" as used herein refers to the light ray closest to the optical axis of those included in the light flux 11 between the dioptric system 1 and screen 5. The term "an upper light ray 12u of a light flux 12" as used herein refers to the light ray most remote from the optical axis of those included in the light flux 12 between the dioptric system 1 and screen 5.

In the projection optical system 10 composed of the dioptric system 1 and the catoptric system 2 having a negative power as illustrated in FIG. 2, a light ray reflected by the catoptric system passes above the lens L13 closest to the catoptric system in the dioptric system 1. Here, attention is given to an intersection point 13 between the lower light ray 11s of the light flux 11 focused on the bottom center of the conjugate image and the upper light ray 12u of the light flux 12 focused on the top center of the conjugate image, and the position of the intersection point is set appropriately as described above. In this way, while the apparatus is configured such that the light fluxes used for image formation and optical members do not interfere with each other, the entire system may be downsized by brining the dioptric system 1 and the catoptric system 2 closer to each other and the distance between the housing and the screen may be reduced.

Further, the projection optical system 10 is configured so as to satisfy a conditional expression (1) given below:

$$0.35 < Dc/Dd < 0.55 \qquad (1),$$

where:

Dc is a distance on the optical axis between the dioptric system 1 and the catoptric system 2; and Dd is a distance on the optical axis from the most reduction side lens surface to the most magnification side lens surface in the dioptric system 1.

If the projection optical system exceeds the upper limit of the conditional expression (1), the projection optical system becomes large, and hence a unit in which the projection optical system is mounted also becomes large. If the projection optical system falls below the lower limit of the conditional expression (1), it is difficult to avoid interference between a light flux reflected by the catoptric system 2 and the dioptric system 1 or the manufacturing difficulty for the magnification side surface of the lens closest to the catoptric system in the dioptric system 1 is increased, thereby leading to a cost increase.

Preferably, the dioptric system 1 has two or more aspherical lenses on the magnification side of the aperture stop 8. This is advantageous for the correction of off-axis aberrations, thereby facilitating satisfactory correction of astigmatism and field curvature.

Preferably, the dioptric system 1 has one or more aspherical lenses on the reduction side of the aperture stop 8. This facilitates satisfactory correction of spherical aberration and coma aberration.

Preferably, all optical surfaces constituting the dioptric system 1 and the catoptric system 2 are composed of rotationally symmetric surfaces. This improves the manufacturability in comparison with the case in which they are composed of rotationally asymmetric surfaces, leading to a cost reduction. Further, since the dioptric system 1 and the catoptric system 2 are arranged coaxially as described above, various types of aberrations, including distortion which is concerned when the entire length of the optical system or the size of the reflection mirror is reduced.

Figure 9:
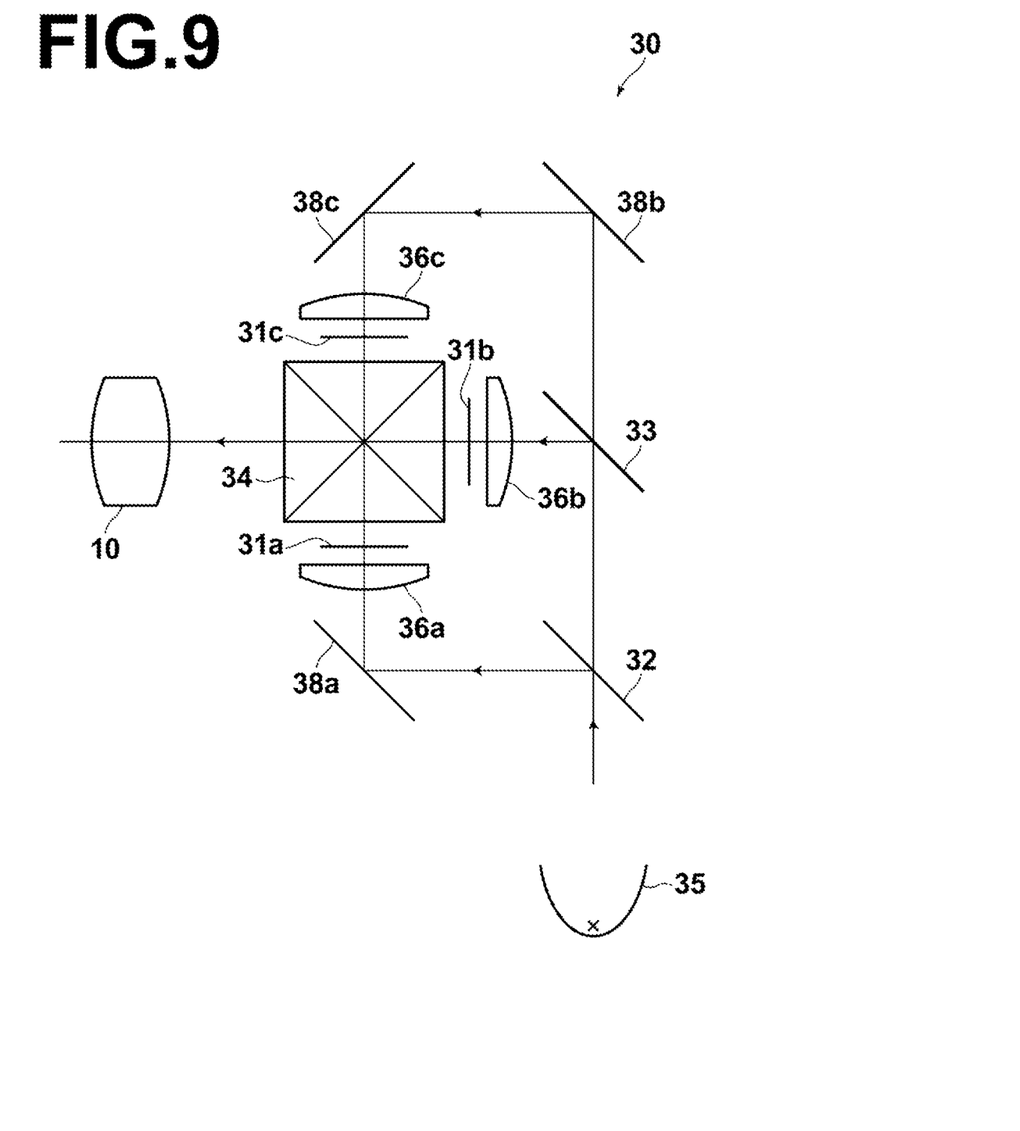
FIG. 9 is a cross-sectional view of an illumination optical system of a projection display apparatus according to an embodiment of the present invention, illustrating the configuration thereof.

An illumination optical system used in the projection display apparatus 20 will now be described with reference to FIG. 9. FIG. 9 illustrates a schematic configuration diagram of the illumination optical system 30. The illumination optical system 30 includes a light source 35, dichroic mirrors 32, 33 for color separation, total reflection mirrors 38a to 38c, condenser lenses 36a to 36c, transmissive liquid crystal display panels 31a to 31c as light valves, and a cross dichroic prism 34 for color composition. Note that the structure between the light source 35 and the dichroic mirror 32 is omitted in FIG. 9.

A white light emitted from the light source 35 is separated into three color light fluxes (G light, B light, R light) by the dichroic mirrors 32, 33 and optical paths of the separated light fluxes are deflected by the total reflection mirrors 38a to 38c, whereby the separated light fluxes are inputted to the corresponding liquid crystal panels 31a to 31c through the condenser lenses 36a to 36c and optically modulated. The optically modulated light fluxes are color-combined by the cross dichroic prism 34, and the combined light flux is inputted to the projection optical system 10 and projected onto the screen 5 by the projection optical system 10.

Next, specific Examples 1 and 2 of the projection optical system used in the projection display apparatus of the present invention will be described.

Example 1

The projection optical system of Example 1 is as illustrated in FIG. 2. The dioptric system 1 of the projection optical system of Example 1 is composed of a positive meniscus lens L1 having a convex surface on the reduction side, a cemented lens constituted by a negative meniscus lens L2 having a convex surface on the reduction side and a positive meniscus lens L3 having a convex surface on the reduction side cemented with each other, a bi-convex lens L4 in the paraxial region, a cemented lens constituted by a negative meniscus lens L5 having a convex surface on the reduction side and a positive meniscus lens L6 having a convex surface on the reduction side cemented with each other, an aperture stop 8 (virtual aperture stop), a bi-convex lens L7, a cemented lens constituted by a hi-convex lens L8 and a bi-concave lens L9 cemented with each other, a cemented lens constituted by a negative meniscus lens L10 having a convex surface on the magnification side and a positive meniscus lens L11 having a convex surface on the magnification side, a positive meniscus lens L12 having a convex surface on the magnification side in the paraxial region, and a hi-concave lens L13 in the paraxial region arranged in this order from the reduction side. The lenses L4, L12, and L13 have aspherical surfaces on both sides. The catoptric system 2 of the projection optical system of Example 1 is composed of one aspherical reflection mirror 4. All optical surfaces constituting the dioptric system 1 and the catoptric system 2 of the projection optical system of Example 1 are composed of rotationally symmetric surfaces.

Basic lens data of the projection optical system of Example 1 are shown in Table 1. In Table 1, the Si column indicates the number of $i^{th}$ (i=1, 2, 3, - - - ) surface which is sequentially increased toward the magnification side with the reduction side surface of the most reduction side component being taken as the first surface. The Ri column indicates a radius of curvature of $i^{th}$ surface and the Di column indicates a surface distance on the optical axis Z between the $i^{th}$ surface and $(i+1)^{th}$ surface. The Ndj column indicates a refractive index of $j^{th}$ (j=1, 2, 3, - - - ) lens, which is sequentially increased toward the magnification side with the most reduction side component being taken as the first component, with respect to d-line (wavelength of 587.6 nm), and the vdj column indicates an Abbe number of $j^{th}$ component with respect to d-line.

Table 1 shows basic lens data of the cover glass 6 to the reflection mirror 4, and a note of "Reflection Surface" is provided in the Ndj column for the reflection mirror 4. The sign of the radius of curvature is positive if the surface shape is convex on the reduction side and negative if the surface shape is convex on the magnification side. As the unit of length, "mm" is used in the basic lens data, but other appropriate units may also be used as the optical system can be used by proportionally enlarged or reduced. In Table 1, the surface number with * mark attached thereto indicates that the surface of that number is aspherical and a value of radius of paraxial curvature is indicated in the column of the radius of curvature of the aspherical surface.

Aspherical surface coefficients of the aspherical surfaces of the projection lens of Example 1 are shown in Table 2. The "E-n (n: integer)" in an aspherical surface coefficient value in Table 2 refers to "×10$^{-n}$" and "E+n" refers to "×10$^{n}$". The aspherical surface coefficient is each of coefficients K, $A_m$ (m=3, 4, 5, - - - ) in an aspherical surface expression represented by the formula given below. Note that each table given below indicates values rounded at a predetermined digit.

$$Zd = \frac{C \times Y^2}{1 + \sqrt{1 - K \times C^2 \times Y^2}} + \sum_m A_m Y^m$$

where,

Zd is a length of a perpendicular line drawn from a point on the aspherical surface at a distance Y from the optical axis to a tangent plane to the vertex of the aspherical surface (plane orthogonal to the optical axis);

Y is a distance from the optical axis;
C is a curvature near the optical axis; and
K, $A_m$ are aspherical surface coefficients (m=3, 4, 5, - - - ).

TABLE 1

Example 1 Basic Lens Data

| Si | Ri | Di | Ndj | vdj |
|---|---|---|---|---|
| 1 | ∞ | 4.97 | 1.51680 | 64.2 |
| 2 | ∞ | 9.10 | | |
| 3 | ∞ | 31.50 | 1.51680 | 64.2 |
| 4 | ∞ | 5.78 | | |
| 5 | 45.977 | 5.66 | 1.83400 | 37.2 |
| 6 | 863.159 | 0.20 | | |
| 7 | 32.554 | 1.65 | 1.80610 | 33.3 |
| 8 | 18.142 | 12.12 | 1.49700 | 81.5 |
| 9 | 479.463 | 0.20 | | |
| *10 | 109.887 | 4.13 | 1.51007 | 56.2 |
| *11 | −688.750 | 0.96 | | |
| 12 | 287.491 | 2.25 | 1.72825 | 28.3 |
| 13 | 20.022 | 6.50 | 1.49700 | 81.5 |
| 14 | 164.202 | 16.84 | | |
| Aperture Stop | ∞ | 9.50 | | |
| 16 | 122.643 | 6.53 | 1.61310 | 44.4 |
| 17 | −40.970 | 19.86 | | |
| 18 | 37.877 | 8.97 | 1.72047 | 34.7 |
| 19 | −74.671 | 2.25 | 1.59522 | 67.7 |
| 20 | 24.968 | 10.81 | | |
| 21 | −18.032 | 2.70 | 1.75520 | 27.5 |
| 22 | −195.991 | 3.30 | 1.71300 | 53.9 |
| 23 | −60.576 | 0.47 | | |
| *24 | −29.751 | 6.00 | 1.49100 | 57.6 |
| *25 | −26.591 | 26.92 | | |
| *26 | −166.313 | 6.00 | 1.49100 | 57.6 |
| *27 | 50.889 | 62.40 | | |
| *28 | 170.155 | −535.00 | Reflection Surface | |
| Dd | | 153.80 | | |
| Dc/Dd | | 0.41 | | |

The diameter φ of the opening of the aperture stop of the projection optical system of Example 1 is 26 mm. The corresponding value of the conditional expression (1) and the value of Dd of the projection optical system of Example 1 are shown under the basic lens data in Table 1. The projection optical system of Example 1 satisfies the conditional expression (1).

Figure 3:
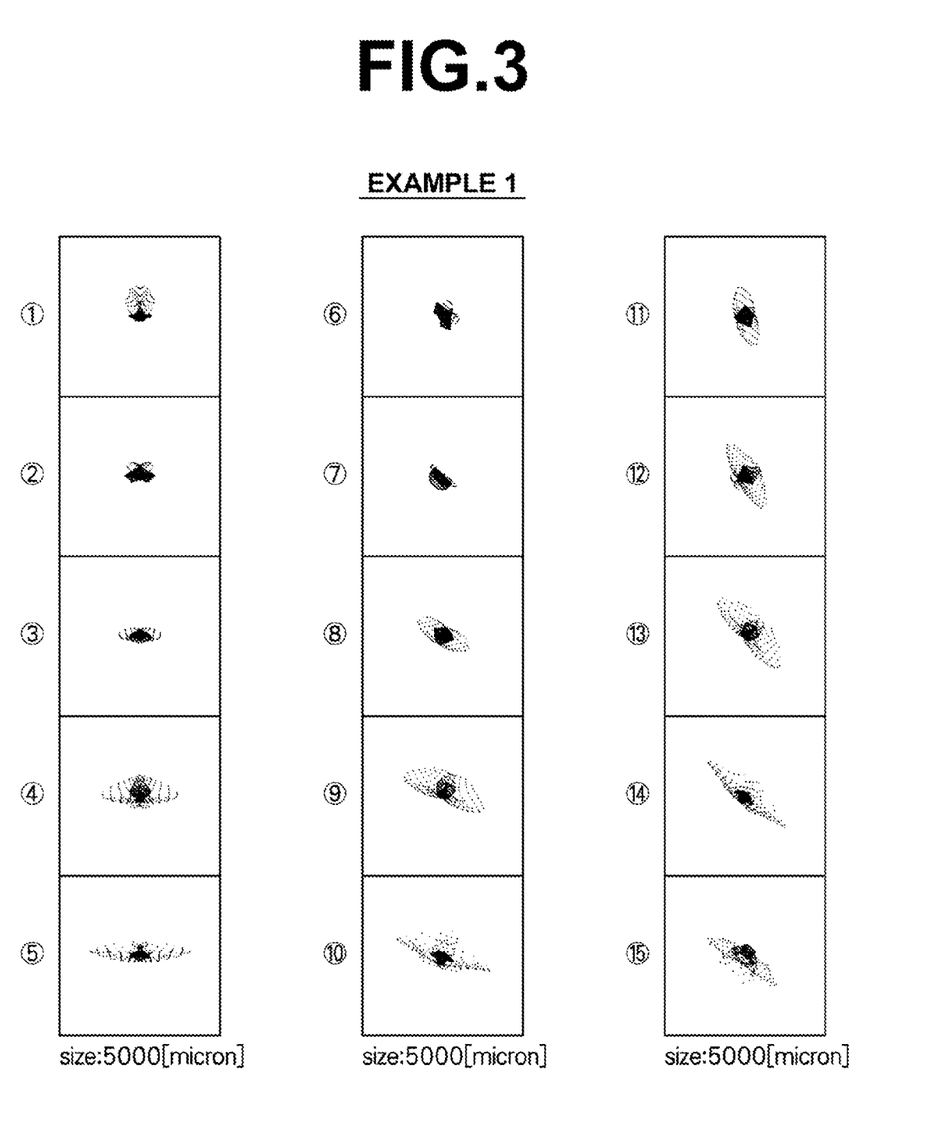
FIG. 3 illustrates spot diagrams of the projection optical system according to Example 1 of the present invention.
Figure 8:
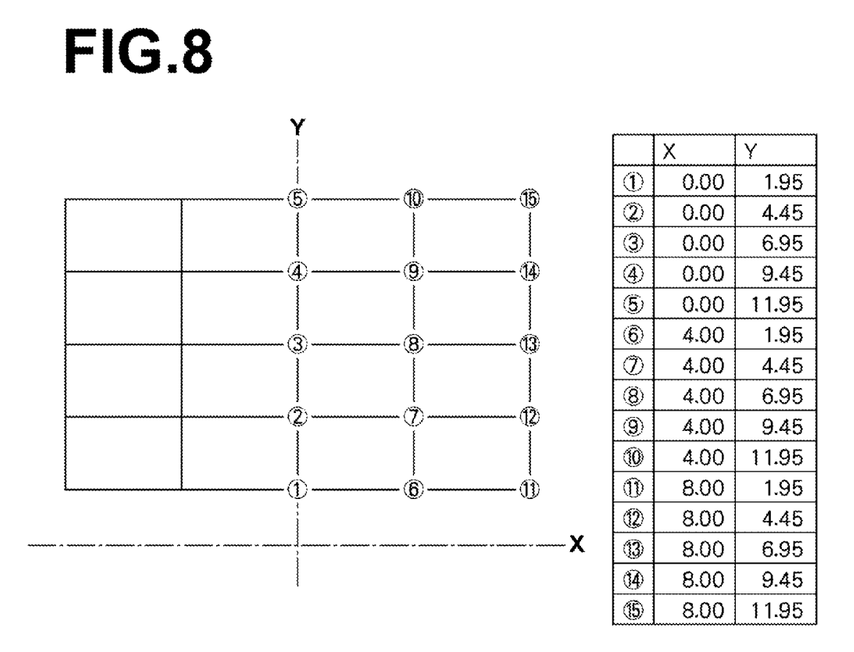
FIG. 8 is a drawing for explaining coordinates of the spot diagrams of FIGS. 4 and 7.

Spot diagrams of the projection optical system of Example 1 on the screen at a wavelength of 550 nm are shown in FIG. 3. The horizontal length of the frame of each spot diagram in FIG. 3 corresponds to 5000 μm. The number appearing on the left side of each spot diagram corresponds to each position on the display surface of the image display element 3 shown in FIG. 8. FIG. 8 shows the display surface by the largest rectangle on the assumption that the display surface of the image display element 3 is located in an XY plane orthogonal to the optical axis. The XY coordinates of each number are shown in the table on the right of FIG. 8. The unit of the XY coordinate values is "mm". The position of the encircled number 3 is the center of the display surface of the image display element 3.

Figure 4:
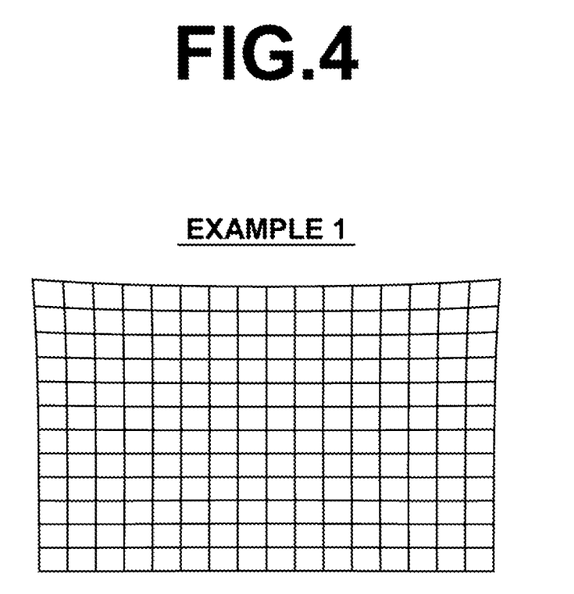
FIG. 4 illustrates a distortion grid of the projection optical system according to Example 1 of the present invention.

A distortion grid of the projection optical system of Example 1 on the screen is shown in FIG. 4. As is clear from FIGS. 3 and 4, the projection optical system of Example 1 is a high performance projection optical system capable of satisfactorily correcting chromatic aberration and distortion.

Example 2

Figure 5:
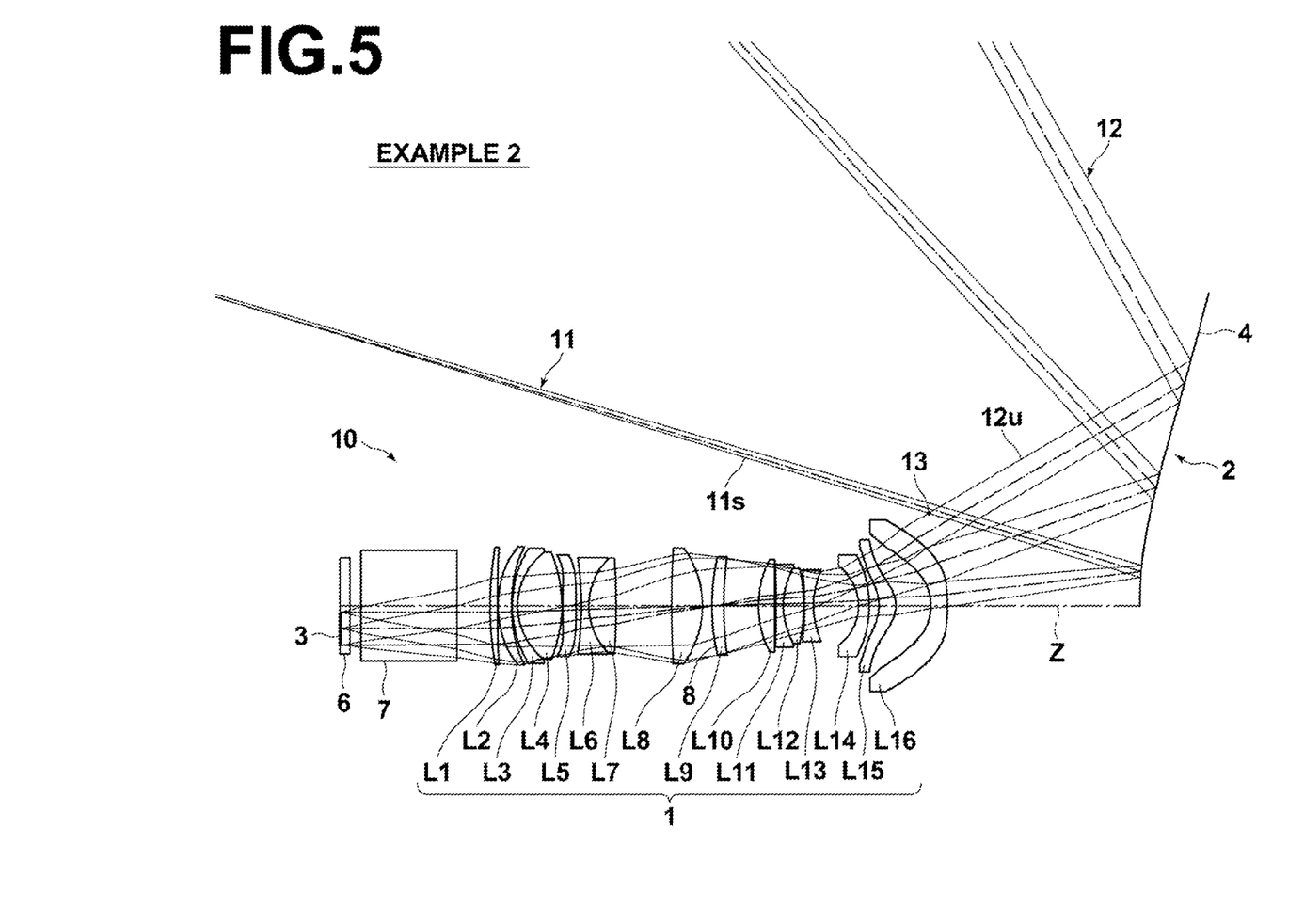
FIG. 5 is a cross-sectional view of a projection optical system according to Example 2 of the present invention, illustrating the configuration thereof.

The configuration of the projection optical system of Example 2 is illustrated in FIG. 5. The dioptric system 1 of the projection optical system of Example 2 is composed of a positive meniscus lens L1 having a convex surface on the reduction side, a cemented lens constituted by a positive meniscus lens L2 having a convex surface on the reduction side in the paraxial region, a negative meniscus lens L3 hav-

TABLE 2

Example 1 Aspherical Surface Coefficients

| | Si | | | |
|---|---|---|---|---|
| | *10 | *11 | *24 | *25 |
| K | 1.0000000E+00 | 1.7425632E+03 | 1.0000000E+00 | 1.0000000E+00 |
| A3 | 0.0000000E+00 | 0.0000000E+00 | 0.0000000E+00 | 0.0000000E+00 |
| A4 | −7.0965175E−06 | −3.0437364E−06 | 6.4434016E−05 | 4.2469454E−05 |
| A5 | 6.6740321E−07 | 2.4238951E−06 | 1.5155710E−06 | 2.2460034E−06 |
| A6 | 5.9366375E−09 | −1.8425494E−07 | −1.7771839E−07 | −6.5026127E−08 |
| A7 | 2.2056261E−10 | 2.7533282E−09 | −2.7284014E−09 | −4.2997846E−09 |
| A8 | −2.2976042E−10 | 7.5083851E−10 | 2.9481324E−10 | −4.8799995E−11 |
| A9 | 2.8130175E−11 | −4.0852765E−11 | −5.0110733E−12 | 6.0170694E−12 |
| A10 | −1.0008012E−12 | 2.5677192E−13 | 1.4118444E−13 | 1.9909529E−13 |
| A11 | 0.0000000E+00 | 0.0000000E+00 | 6.7898358E−15 | −4.4455990E−15 |
| A12 | 0.0000000E+00 | 0.0000000E+00 | −3.8632283E−16 | −8.1234084E−17 |

| | Si | | |
|---|---|---|---|
| | *26 | *27 | *28 |
| K | 2.9764165E+01 | 9.2558900E−01 | 1.0000000E+00 |
| A3 | −1.4285193E−04 | −1.2678382E−04 | 0.0000000E+00 |
| A4 | −1.4156919E−04 | −1.6417840E−04 | −3.2055450E−08 |
| A5 | 7.3161249E−06 | 1.0435962E−05 | −3.4954735E−09 |
| A6 | −1.1931839E−07 | −2.0754614E−07 | 1.6727633E−11 |
| A7 | 1.3761798E−09 | −3.9427844E−09 | 4.1806214E−13 |
| A8 | −6.5747054E−11 | 1.4814652E−10 | −5.4469572E−15 |
| A9 | −5.0883144E−12 | 3.1853809E−12 | 2.6300426E−17 |
| A10 | 2.4805008E−14 | −1.2458466E−13 | −7.6848180E−20 |
| A11 | 1.3064337E−14 | −1.0510833E−15 | 2.8198644E−22 |
| A12 | −2.4647294E−16 | 4.7664033E−17 | −7.6670830E−25 | ing a convex surface on the reduction side, and a bi-convex lens L4 cemented with each other, a cemented lens constituted by a bi-convex lens L5 in the paraxial region, a bi-concave lens L6, and a bi-convex lens L7 cemented with each other, a bi-convex lens L8, an aperture stop 8 (virtual aperture stop), a positive meniscus lens L9 having a convex surface on the reduction side, a bi-convex lens L10, a cemented lens constituted by a bi-concave lens L11 and a bi-convex lens L12 cemented with each other, a bi-concave lens L13, a negative meniscus lens L14 having a convex surface on the magnification side, a positive meniscus lens L15 having a convex surface on the magnification side in the paraxial region, and a Plano-concave lens L16 having a flat surface on the magnification side in the paraxial region arranged in this order from the reduction side. The lenses L2, L5, L15, and L16 have aspherical surfaces on both sides. The catoptric system 2 of the projection optical system of Example 2 is composed of one aspherical reflection mirror 4 having a negative power. In the projection optical system of Example 2, the dioptric system 1 and the catoptric system have a common optical axis Z and all optical surfaces constituting the dioptric system 1 and the catoptric system 2 are composed of rotationally symmetric surfaces.

Also in the projection optical system of Example 2, the image display element 3 is eccentrically disposed with respect to the optical axis such that the center of the display surface thereof is vertically below the optical axis Z, and the projection optical system of Example 2 is configured such that, when a magnification side conjugate position of the center of the display surface of the image display element 3 is arranged so as to be vertically above the optical axis Z, an intersection point 13 between a lower light ray 11s of a light flux 11 focused on the bottom center of a conjugate image magnified and projected onto the screen 5 (not shown in FIG. 5) and an upper light ray 12u of a light flux 12 focused on the top center of the conjugate image is on the reduction side of a magnification side surface vertex of the lens L16 closest to the catoptric system 2 in the dioptric system 1, as in the projection optical system of Example 1.

Basic lens data and aspherical surface coefficients of the projection optical system of Example 2 are shown in Tables 3, 4 respectively. The meaning of each symbol in Tables 3, 4 and the representation method are identical to those of Example 1 described above. The diameter φ of the opening of the aperture stop of the projection optical system of Example 2 is 29.9 mm. The corresponding value of the conditional expression (1) and the value of Dd of the projection optical system of Example 2 are shown under the basic lens data in Table 3. The projection optical system of Example 2 satisfies the conditional expression (1).

TABLE 3

Example 2 Basic Lens Data

| Si | Ri | Di | Ndj | vdj |
|---|---|---|---|---|
| 1 | ∞ | 3.00 | 1.51680 | 64.2 |
| 2 | ∞ | 3.40 | | |
| 3 | ∞ | 29.00 | 1.51680 | 64.2 |
| 4 | ∞ | 10.00 | | |
| 5 | 108.338 | 2.23 | 1.59522 | 67.7 |
| 6 | 374.719 | 0.20 | | |
| *7 | 32.939 | 4.05 | 1.49100 | 57.6 |
| *8 | 52.206 | 0.20 | | |
| 9 | 33.312 | 1.65 | 1.83400 | 37.2 |
| 10 | 20.533 | 13.35 | 1.49700 | 81.5 |
| 11 | −42.954 | 0.20 | | |
| *12 | 91.446 | 4.13 | 1.51007 | 56.2 |
| *13 | −5767.549 | 1.58 | | |
| 14 | −103.850 | 2.25 | 1.83400 | 37.2 |
| 15 | 20.171 | 8.31 | 1.49700 | 81.5 |
| 16 | −220.492 | 17.00 | | |
| 17 | 296.647 | 9.32 | 1.51680 | 64.2 |
| 18 | −30.194 | 2.93 | | |
| Aperture Stop | 68.633 | 0.00 | | |
| 20 | 68.633 | 3.58 | 1.80400 | 46.6 |
| 21 | 119.796 | 10.20 | | |
| 22 | 30.976 | 4.97 | 1.58144 | 40.8 |
| 23 | −10409.671 | 0.32 | | |
| 24 | −320.321 | 2.25 | 1.59522 | 67.7 |
| 25 | 23.065 | 6.16 | 1.51742 | 52.2 |
| 26 | −56.260 | 0.20 | | |
| 27 | −106.121 | 2.70 | 1.71300 | 53.9 |
| 28 | 25.730 | 13.65 | | |
| 29 | −14.993 | 3.30 | 1.80518 | 25.5 |
| 30 | −32.438 | 2.96 | | |
| *31 | −12.085 | 5.00 | 1.49100 | 57.6 |
| *32 | −9.493 | 10.66 | | |
| *33 | −17.305 | 5.00 | 1.49100 | 57.6 |
| *34 | ∞ | 58.17 | | |
| *35 | 116.759 | −550.00 | Reflection Surface | |
| Dd | | 138.34 | | |
| Dc/Dd | | 0.42 | | |

TABLE 4

Example 2 Aspherical Surface Coefficients

| | Si | | | | |
|---|---|---|---|---|---|
| | *7 | *8 | *12 | *13 | *31 |
| K | 1.1120512E+00 | 1.7808375E+00 | −1.3905126E+02 | −8.1180287E+04 | −9.3836372E−01 |
| A3 | −2.7642282E−05 | −3.2215817E−05 | −1.1266301E−05 | −1.2110943E−05 | −1.7441709E−04 |
| A4 | 4.1506921E−06 | 6.3837274E−06 | −2.0142854E−05 | −3.2129872E−05 | 1.2240574E−04 |
| A5 | 1.4287405E−07 | 8.1235352E−08 | 5.1733386E−07 | −1.3155900E−06 | −3.0571131E−05 |
| A6 | 4.8228529E−09 | 4.3173306E−09 | −3.3879745E−07 | 1.6319000E−07 | 5.1335490E−06 |
| A7 | −2.8984265E−11 | 1.5674184E−10 | 7.1567658E−10 | −1.7955540E−08 | −2.5060430E−07 |
| A8 | 3.6697573E−12 | −4.5578001E−12 | 4.0252826E−09 | 2.8429822E−09 | −5.6856519E−09 |
| A9 | −1.7189564E−14 | −5.1364571E−13 | −3.3079582E−10 | −4.6691738E−10 | −1.8702061E−10 |
| A10 | −9.8699816E−15 | −2.2815624E−15 | −5.4352680E−12 | 3.2382295E−11 | 9.3872715E−11 |
| A11 | 1.0021567E−16 | 1.6901044E−16 | 1.5264413E−12 | −3.5316120E−13 | 1.5084944E−14 |
| A12 | −8.0860024E−19 | 7.2785521E−20 | −1.0817036E−14 | 1.6128776E−14 | −3.0725297E−1.3 |
| A13 | 5.9605732E−20 | −3.0184468E−19 | −2.1730225E−15 | −2.6915575E−15 | −4.5465289E−15 |
| A14 | −6.6425667E−22 | −1.1913854E−20 | 6.0374854E−17 | −4.1055070E−16 | 4.1286695E−16 |
| A15 | 8.3169438E−23 | −9.3805652E−23 | −1.2594815E−17 | 2.5098136E−17 | 3.4460281E−17 |

TABLE 4-continued

Example 2 Aspherical Surface Coefficients

| | | | | | |
|---|---|---|---|---|---|
| A16 | 9.0820391E−24 | −4.2816826E−24 | −6.2360886E−19 | 8.2237744E−19 | 2.0362615E−18 |
| A17 | 1.6907817E−25 | −2.2882864E−25 | 1.8397931E−19 | 7.9045845E−20 | −2.7507895E−19 |
| A18 | −2.8451865E−27 | 5.6396820E−27 | −7.1439854E−21 | −1.6645209E−20 | −6.5104551E−22 |
| A19 | 4.0923330E−28 | 4.0990000E−28 | −4.5103534E−23 | 7.0394403E−22 | 5.3108734E−22 |
| A20 | −1.3911929E−29 | 3.0408386E−29 | 4.4848438E−24 | −9.2800074E−24 | −1.1092153E−23 |

| | Si | | | |
|---|---|---|---|---|
| | *32 | *33 | *34 | *35 |
| K | −5.3547418E−01 | −6.8946340E+00 | 3.6029376E+10 | −9.5919084E−01 |
| A3 | −2.7566899E−04 | −1.6810879E−03 | −1.2028804E−03 | −6.3120648E−06 |
| A4 | 8.3208999E−05 | −1.8488644E−05 | −2.0332496E−05 | −3.9208006E−07 |
| A5 | −1.8059802E−05 | 4.3341785E−07 | 1.5345859E−06 | 6.0851096E−08 |
| A6 | 3.1024241E−06 | −1.8569265E−08 | −1.2306080E−08 | −3.0382339E−09 |
| A7 | −2.1357884E−07 | 4.6032655E−09 | −7.0890629E−10 | 6.4191605E−11 |
| A8 | 8.3295576E−09 | −5.0250177E−11 | 1.0646088E−11 | −6.1938950E−13 |
| A9 | −4.6901881E−11 | 2.2115315E−12 | 1.9626994E−13 | 1.8173441E−15 |
| A10 | −1.2183828E−11 | 1.5116605E−14 | 6.9491745E−15 | 5.4703492E−18 |
| A11 | −1.3897286E−12 | −1.3352967E−15 | −1.8044016E−16 | 1.1866449E−19 |
| A12 | 1.2842027E−13 | −1.9627431E−17 | −7.6259637E−18 | −2.0695731E−21 |
| A13 | 3.7663435E−15 | −7.7395412E−20 | 1.1063252E−20 | −1.5037933E−23 |
| A14 | −3.9948316E−16 | −3.1519314E−21 | −1.5459781E−21 | 6.2563770E−25 |
| A15 | −7.8494048E−18 | −1.1742307E−22 | 3.3576486E−23 | −4.1812048E−27 |
| A16 | 8.8334662E−19 | −6.2678669E−24 | −2.1117277E−25 | −3.5974904E−29 |
| A17 | −4.3927542E−23 | −8.2449271E−24 | 1.4247713E−27 | 5.9497653E−31 |
| A18 | −7.6963532E−22 | −3.4105454E−26 | 6.2165222E−28 | −1.9332075E−33 |
| A19 | 6.3912543E−24 | −2.4613239E−27 | 1.7314458E−28 | −5.2227263E−36 |
| A20 | 1.5003878E−25 | −1.4301654E−28 | 6.9174359E−31 | 2.8528077E−38 |

Figure 6:
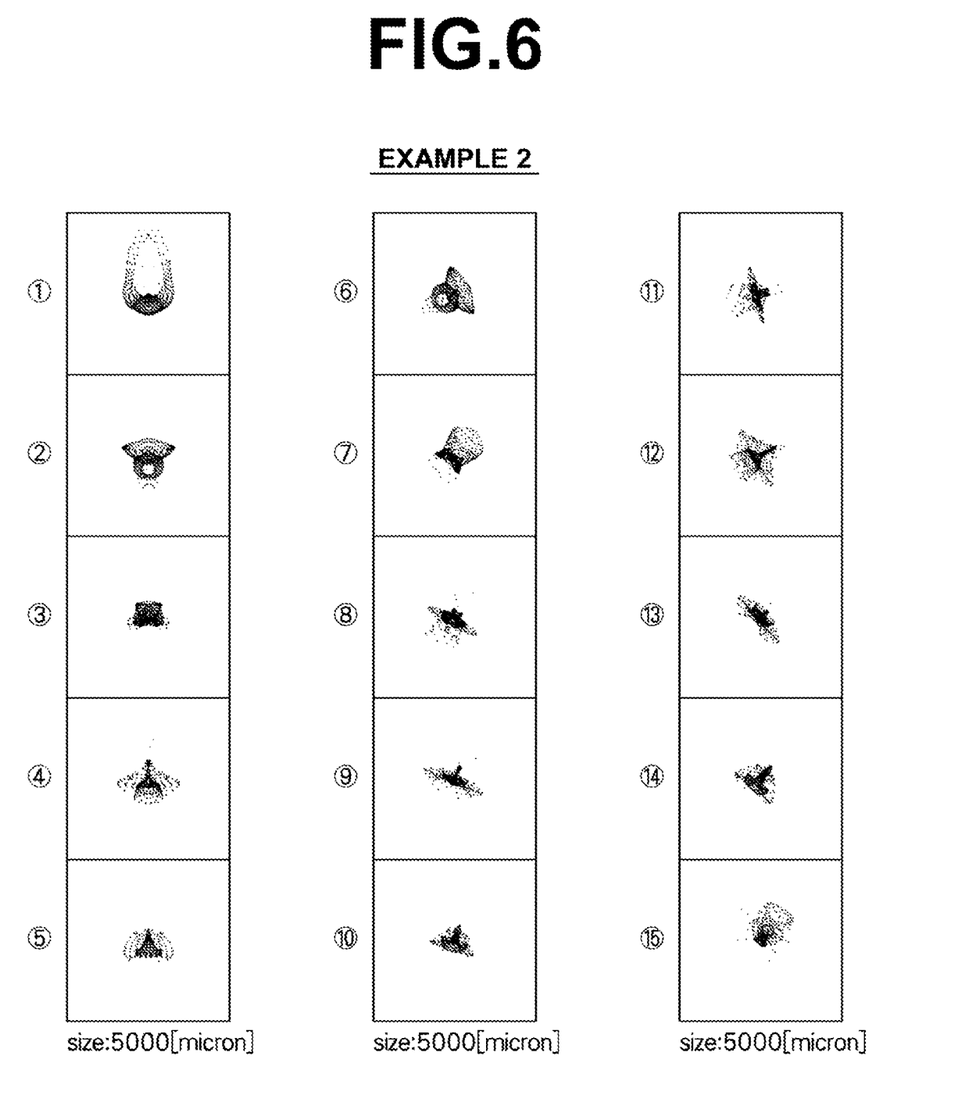
FIG. 6 illustrates spot diagrams of the projection optical system according to Example 2 of the present invention.
Figure 7:
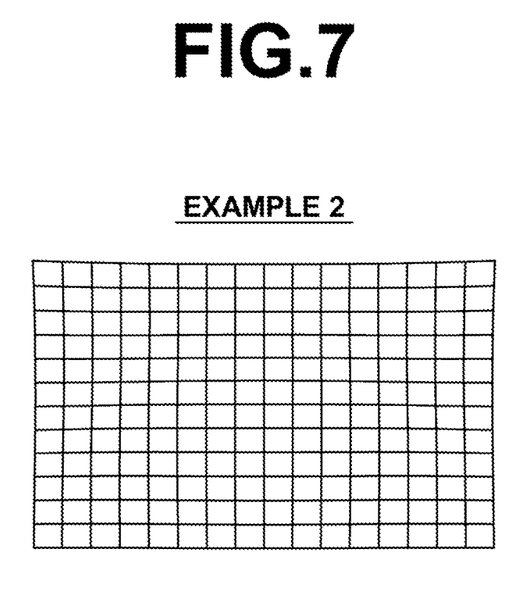
FIG. 7 illustrates a distortion grid of the projection optical system according to Example 2 of the present invention.

Spot diagrams and distortion of the projection optical system of Example 2 on the screen are shown in FIGS. 6, 7 respectively. The meaning of each symbol in FIGS. 6, 7 and the representation method are identical to those of the Example 1. As is clear from FIGS. 6 and 7, the projection optical system of Example 2 is a high performance projection optical system capable of satisfactorily correcting chromatic aberration and distortion.

So far the present invention has been described by way of embodiments and Examples, but it should be understood that the present invention is not limited to the embodiments and Examples described above, and various changes and modifications may be made. For example, values of radius of curvature of each lens, surface distance, refractive index, Abbe number, aspherical surface coefficient and the like of the projection lens of the present invention may be changed as appropriate. Further, the light valve, optical member used for light flux separation or light flux combining are not limited to the compositions described above, and various changes and modifications may be made to the embodiments.

What is claimed is:

1. A projection display apparatus provided with an image display element for displaying an image on a reduction side conjugate plane and a projection optical system for projecting the image onto a magnification side conjugate plane as a conjugate image, wherein:
    the projection optical system substantially consists of a dioptric system substantially composed of a plurality of lenses and a catoptric system having a negative power arranged in this order from the reduction side;
    the dioptric system and the catoptric system have a common optical axis;
    the center of a display surface of the image display element for displaying the image is disposed eccentrically with respect to the optical axis, and the projection optical system is configured such that, when a magnification side conjugate position of the center of the display surface is vertically above the optical axis, an intersection point between a lower light ray of a light flux focused on the bottom center of the conjugate image and an upper light ray of a light flux focused on the top center of the conjugate image is on the reduction side of a surface vertex of a lens surface closest to the catoptric system in the dioptric system; and
    the projection optical system satisfies a conditional expression (1) given below:

$$0.35 < Dc/Dd < 0.55 \tag{1}$$

where:
    Dc is a distance on the optical axis between the dioptric system and the catoptric system; and
    Dd is a distance on the optical axis from the most reduction side lens surface to the most magnification side lens surface in the dioptric system.

2. The projection display apparatus of claim 1, wherein all optical surfaces constituting the dioptric system and the catoptric system are composed of rotationally symmetric surfaces.

3. The projection display apparatus of claim 1, wherein the dioptric system includes therein an aperture stop and has one or more aspherical lenses on the reduction side of the aperture stop.

4. The projection display apparatus of claim 3, wherein all optical surfaces constituting the dioptric system and the catoptric system are composed of rotationally symmetric surfaces.

5. The projection display apparatus of claim 1, wherein the dioptric system includes therein an aperture stop and has two or more aspherical lenses on the magnification side of the aperture stop.

6. The projection display apparatus of claim 5, wherein the dioptric system has one or more aspherical lenses on the reduction side of the aperture stop.

7. The projection display apparatus of claim 6, wherein all optical surfaces constituting the dioptric system and the catoptric system are composed of rotationally symmetric surfaces.

8. The projection display apparatus of claim 5, wherein all optical surfaces constituting the dioptric system and the catoptric system are composed of rotationally symmetric surfaces.

* * * * *